(12) United States Patent
Sun et al.

(10) Patent No.: US 12,352,915 B2
(45) Date of Patent: Jul. 8, 2025

(54) METHOD AND SYSTEM FOR ESTIMATING CONVERTED-WAVE STATICS

(71) Applicant: SAUDI ARABIAN OIL COMPANY, Dhahran (SA)

(72) Inventors: Yimin Sun, The Hague (NL); Mohammed S. Mubarak, Dhahran (SA); Victor Dolgov, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 456 days.

(21) Appl. No.: 18/050,875

(22) Filed: Oct. 28, 2022

(65) Prior Publication Data

US 2024/0142648 A1 May 2, 2024

(51) Int. Cl.
*G01V 1/30* (2006.01)
*G01V 1/37* (2006.01)
*G01V 1/42* (2006.01)

(52) U.S. Cl.
CPC .............. *G01V 1/301* (2013.01); *G01V 1/305* (2013.01); *G01V 1/375* (2013.01); *G01V 1/42* (2013.01)

(58) Field of Classification Search
USPC .......................................................... 702/14
See application file for complete search history.

(56) References Cited

U.S. PATENT DOCUMENTS 5,508,914 A * 4/1996 Lee ........................ G01V 1/362
702/14
7,894,299 B2 2/2011 Meier
(Continued)

FOREIGN PATENT DOCUMENTS

CN 1325937 C 7/2007
CN 101984367 A 3/2011
(Continued)

OTHER PUBLICATIONS

Villa Acuna, Yenni Paloma, "An enhanced Genetic Algorithm and its application on two non-linear geophysical problems"; Master of Science thesis for the degree of Master of Science in Applied Geophysics at Delt University of Technology, ETH Zürich, RWTH Aachen University; pp. vi-66; Aug. 10, 2018 (78 pages).
(Continued)

*Primary Examiner* — Paul D Lee
(74) *Attorney, Agent, or Firm* — Osha Bergman Watanabe & Burton LLP

(57) ABSTRACT

Methods and systems for estimating converted-wave statics are disclosed. The methods include obtaining a multicomponent seismic dataset for a subterranean region, determining an array of PP-source statics and an array of PP-receiver statics for the PP-seismic dataset, generating a PP-receiver stack based on the PP-seismic dataset, the array of PP-source statics, and the array of PP-receiver statics, and generating a PS-receiver stack based on the PS-seismic dataset and the array of PP-source statics. The methods also include identifying a PP-target event on the PP-receiver stack, forming a space-time window of the PS-receiver stack guided by the PP-target event, determining an objective function, and determining an array of PS-receiver statics based on an extremum of the objective function. The methods further include forming a statics-corrected PS-seismic dataset based on the array of PS-receiver statics and the array of PP-source statics, and forming a seismic image based on the statics-corrected PS-seismic dataset.

20 Claims, 7 Drawing Sheets

(56) References Cited

U.S. PATENT DOCUMENTS

| | | | |
|---|---|---|---|
| 9,052,407 B2 | 6/2015 | Jing et al. | |
| 9,348,049 B2 | 5/2016 | Le Meur et al. | |
| 11,086,036 B2 | 8/2021 | Zhao et al. | |
| 11,215,720 B2 | 1/2022 | Wang et al. | |
| 2013/0182537 A1* | 7/2013 | Hugonnet | G01V 1/36 367/51 |
| 2014/0200817 A1* | 7/2014 | Garceran | G01V 1/34 702/14 |
| 2016/0341835 A1 | 11/2016 | Guillaume et al. | |
| 2016/0377751 A1* | 12/2016 | De Meersman | G01V 1/364 702/16 |
| 2017/0299745 A1 | 10/2017 | Kim et al. | |
| 2021/0063590 A1* | 3/2021 | Cooper | G01V 1/34 |

FOREIGN PATENT DOCUMENTS

| | | |
|---|---|---|
| CN | 101937100 B | 10/2012 |
| CN | 101937098 B | 6/2013 |
| CN | 111665558 A | 9/2020 |

OTHER PUBLICATIONS

Chen, Shuangquan et al., "Converted-wave time domain registration using the inverted pseudo-PS-wave attribute section"; Journal of Geophysics and Engineering; vol. 11, Issue 1, Article No. 015007; pp. 1-12; Feb. 2014 (12 pages).

Compton, Stefan et al., "Estimating VP/VS ratios using smooth dynamic image warping" Geophysics; vol. 79, Issue 6; pp. V201-V215; Nov.-Dec. 2014 (15 pages).

Guirigay, Thais, "Estimation of Shear wave velocities from P-P and P-S seismic data using Equivalent Offset Migration"; A thesis submitted to the Faculty of Graduate Studies in partial fulfilment of the requirements for the degree of Master of Science; University of Calgary, Department of Geoscience; pp. ii-99; Sep. 2012 (113 pages).

Yang, Chunying et al., "Application of Rayleigh waves on PS-wave static corrections"; Journal of Geophysics and Engineering; vol. 9, Issue 1; pp. 90-97; Feb. 2012 (8 pages).

Stewart, Robert R. et al., "Converted-wave seismic exploration: Methods"; Geophysics; vol. 67, No. 5; pp. 1348-1363; Sep.-Oct. 2002 (16 pages).

Jing, Charlie et al., "Converted-wave migration velocities from common-receiver image focusing analysis"; Proceedings of the 2002 SEG Annual Meeting; Paper No. SEG-2002-0994; Oct. 6, 2022 (4 pages).

Chan, Wai-Kin, "Analyzing converted-wave seismic data: Statics, interpolation, imaging, and P-P correlation"; Ph.D. thesis: University of Calgary; 224 pages; Nov. 1999; Abstract only—full copy unavailable (1 page).

* cited by examiner

METHOD AND SYSTEM FOR ESTIMATING CONVERTED-WAVE STATICS

BACKGROUND

In the oil and gas industry, seismic surveying is commonly used to investigate subterranean structure, and subsequently in the evaluation and location of oil and gas reservoirs. In seismic surveys, a seismic source generates seismic waves which propagate through the subterranean region. The seismic waves reflect and refract from subterranean structure and are subsequently detected by seismic receivers. Multicomponent seismic receivers are used to detect converted seismic waves, e.g., pressure waves converting to shear waves at a location in the subsurface.

Multicomponent seismic recording captures the seismic wavefield more completely than conventional single component techniques. For example, shear wave properties differ from those of pressure waves, and their relationships can be analyzed to determine changes in lithology or pore geometry. In general, converted-wave analysis provides additional information that can improve seismic imaging and reservoir characterization.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to methods for estimating converted-wave statics. The methods include obtaining a multicomponent seismic dataset for a subterranean region, where the multicomponent seismic dataset comprises a pressure wave (PP) seismic dataset and a pressure-to-shear converted wave (PS) seismic dataset, determining an array of PP-source statics and an array of PP-receiver statics for the PP-seismic dataset, generating a PP-receiver stack based, at least in part, on the PP-seismic dataset, the array of PP-source statics, and the array of PP-receiver statics, where the PP-receiver stack comprises a plurality of source-static and receiver-static corrected PP-stacked traces, and generating a PS-receiver stack based, at least in part, on the PS-seismic dataset and the array of PP-source statics, where the PS-receiver stack comprises a plurality of source-static corrected PS-stacked traces. The methods also include identifying a PP-target event on the PP-receiver stack, forming a space-time window of the PS-receiver stack guided by the PP-target event, where the space-time window comprises a plurality of windowed traces, determining an objective function based, at least in part, on the space-time window, and determining an array of PS-receiver statics based, at least in part, on an extremum of the objective function, where the array comprises one PS-receiver static for each windowed trace. The methods further include forming a statics-corrected PS-seismic dataset based, at least in part, on the PS-seismic dataset, the array of PS-receiver statics, and the array of PP-source statics, where the statics-corrected PS-seismic dataset comprises a plurality of source-static and receiver-static corrected PS-stacked traces, and forming a seismic image based, at least in part, on the statics-corrected PS-seismic dataset.

In general, in one aspect, embodiments disclosed herein relate to a non-transitory computer readable memory, having computer-executable instructions stored thereon that, when executed by a processor, perform steps including receiving a multicomponent seismic dataset for a subterranean region, where the multicomponent seismic dataset comprises a pressure wave (PP) seismic dataset and a pressure-to-shear converted wave (PS) seismic dataset, determining an array of PP-source statics and an array of PP-receiver statics for the PP-seismic dataset, generating a PP-receiver stack based, at least in part, on the PP-seismic dataset, the array of PP-source statics, and the array of PP-receiver statics, where the PP-receiver stack comprises a plurality of source-static and receiver-static corrected PP-stacked traces, and generating a PS-receiver stack based, at least in part, on the PS-seismic dataset and the array of PP-source statics, where the PS-receiver stack comprises a plurality of source-static corrected PS-stacked traces. The steps also include identifying a PP-target event on the PP-receiver stack, forming a space-time window of the PS-receiver stack guided by the PP-target event, where the space-time window comprises a plurality of windowed traces, determining an objective function based, at least in part, on the space-time window, and determining an array of PS-receiver statics based, at least in part, on an extremum of the objective function, where the array comprises one PS-receiver static for each windowed trace. The steps further include forming a statics-corrected PS-seismic dataset based, at least in part, on the PS-seismic dataset, the array of PS-receiver statics, and the array of PP-source statics, where the statics-corrected PS-seismic dataset comprises a plurality of source-static and receiver-static corrected PS-stacked traces, and forming a seismic image based, at least in part, on the statics-corrected PS-seismic dataset.

In general, one aspect, embodiments disclosed herein relate to a system. The system includes a seismic acquisition system configured to record a multicomponent seismic dataset for a subterranean region, where the multicomponent seismic dataset comprises a pressure wave (PP) seismic dataset and a pressure-to-shear converted wave (PS) seismic dataset. The system also includes a seismic processing system configured to receive the multicomponent seismic dataset, determine an array of PP-source statics and an array of PP-receiver statics for the PP-seismic dataset, generate a PP-receiver stack based, at least in part, on the PP-seismic dataset, the array of PP-source statics, and the array of PP-receiver statics, where the PP-receiver stack comprises a plurality of source-static and receiver-static corrected PP-stacked traces, and generate a PS-receiver stack based, at least in part, on the PS-seismic dataset and the array of PP-source statics, where the PS-receiver stack comprises a plurality of source-static corrected PS-stacked traces. The seismic processing system is also configured to identify a PP-target event on the PP-receiver stack, form a space-time window of the PS-receiver stack guided by the PP-target event, where the space-time window comprises a plurality of windowed traces, determine an objective function based, at least in part, on the space-time window, and determine an array of PS-receiver statics based, at least in part, on an extremum of the objective function, where the array comprises one PS-receiver static for each windowed trace. The seismic processing system is further configured to form a statics-corrected PS-seismic dataset based, at least in part, on the PS-seismic dataset, the array of PS-receiver statics, and the array of PP-source statics, where the statics-corrected PS-seismic dataset comprises a plurality of source-static and receiver-static corrected PS-stacked traces, and form a seismic image based, at least in part, on the statics-corrected PS-seismic dataset.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
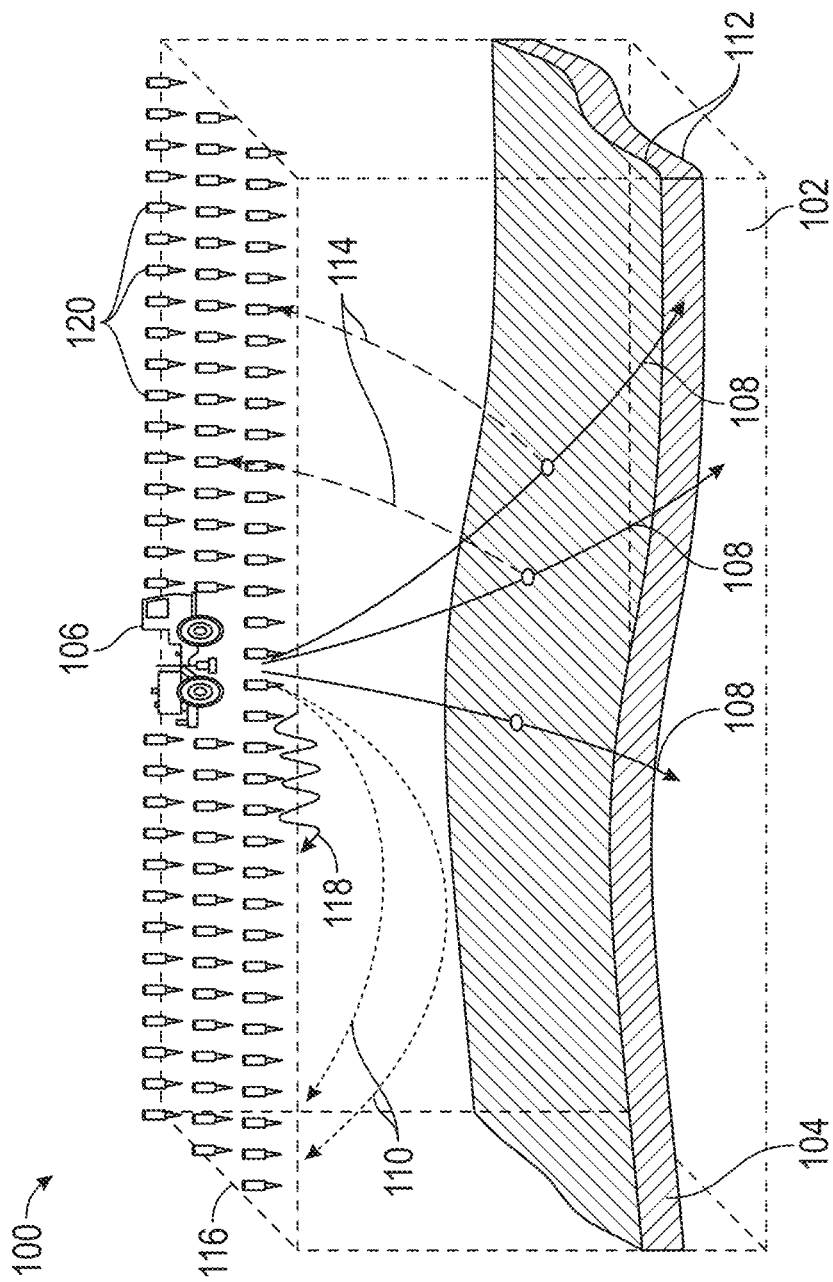
FIG. 1 shows an example of a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic trace" includes reference to one or more of such seismic traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

Seismic waves typically propagate through the near-surface layer more slowly than through deeper subsurface layers. This slow propagation in the near-surface generates distortion in deeper structures of the seismic image. As part of the seismic data processing sequence, time shifts ("statics") are frequently used to correct for the distortive effects of near-surface layer complexity and variation.

Shear waves, which propagate at slower velocities than their pressure wave counterparts, are usually more significantly affected than pressure waves by the near-surface, causing shear-wave seismic data to require larger (i.e., more significant) static corrections than pressure-wave seismic data. Estimating converted-wave statics has been a longstanding challenge and many methods require manual effort, which is not feasible for a seismic dataset of typical size.

Disclosed are embodiments that improve the estimation of converted-wave statics, particularly converted-wave receiver statics. Combining converted-wave receiver statics with pressure-wave source statics forms a complete static solution for converted-wave seismic data. A statics-corrected converted-wave seismic dataset is used to form a seismic image that facilitates hydrocarbon exploration and production. In addition, methods are disclosed for determining and drilling wellbore paths based on the seismic image.

FIG. 1 shows an example of a seismic survey (100) of a subterranean region (102) containing a hydrocarbon reservoir (104). The seismic survey (100) may use a seismic acquisition system to generate and record seismic data. The seismic acquisition system may include one or more seismic sources (106) that generate radiated seismic waves (108). In a land environment, the seismic source (106) may be a dynamite source or one or more seismic vibrators (e.g., a "vibroseis truck"). In a marine or lacustrine environment, the seismic source (106) may be an air gun. The seismic acquisition system may also include a plurality of seismic receivers (120), by which the radiated seismic waves may be recorded. A single activation of the seismic source (106) may be recorded by tens or hundreds of thousands of seismic receivers (120). Typically, in a land environment, the seismic receiver may record the velocity or acceleration of ground motion, while in a marine or lacustrine environment, the seismic receiver may record pressure fluctuations caused by the seismic waves.

The radiated seismic waves (108) may propagate along the ground surface (116) as surface waves (118). The radiated seismic waves (108) may also propagate below the surface (116) and return as refracted seismic waves (110) or may be reflected one or more times by geological discontinuities (112) and return to the surface as reflected seismic waves (114). In general, radiated seismic waves (108), surface seismic waves (118), refracted seismic waves (110), and reflected seismic waves (114), may be referred to as simply "seismic waves". Further, in a multicomponent seismic survey, seismic receivers (120) may detect both pressure waves, often termed primary wave, or P-waves, and shear waves, often termed secondary waves, or S-waves.

Typical seismic sources generate P-waves, although in some multicomponent seismic surveying, an S-wave generating seismic source may be used. That is, some of the seismic waves radiating away from a seismic source may be P-waves and others may be S-waves. Generally, P-waves travel faster than S-waves, thus at any depth, the P-wave arrival times are typically earlier than the S-wave arrival times. When a P-wave impinges on a geological discontinuity (112), it may generate, in addition to a transmitted P-wave, a transmitted S-wave, a reflected P-wave, and a reflected S-wave. Similarly, when an S-wave impinges on a geological discontinuity (112) it may generate, in addition to a transmitted S-wave, a transmitted P-wave, a reflected P-wave, and a reflected S-wave. This principle is referred to as mode-conversion. When a seismic wave undergoes mode-conversion from a P-wave to an S-wave at an interface and is reflected upward towards a seismic receiver (120), the recorded seismic trace may be referred to as a pressure-to-shear converted wave (PS)-trace. Similarly, if the P-wave is reflected from the interface upward towards a seismic receiver (120) as a P-wave, the resulting seismic trace may be referred to as a PP-trace. SS-seismic data (S-waves reflecting S-waves) is not commonly used due to its low resolution and low signal-to-noise characteristics.

In some embodiments, the seismic waves generated by a single activation of the seismic source (106) are recorded by the seismic receivers (120) as a time-series representing the amplitude of ground-motion at a sequence of discrete times. This time-series may be denoted a seismic "trace." In other embodiments, the seismic waves generated by a plurality of activations of the seismic source (106) at a single location may be recorded by each seismic receiver (120) and combined, summed, or "stacked" to form a seismic trace. Further, a series of adjacent traces may exhibit a coherent pattern from a recorded wave response of a geological discontinuity (112) and may be referred to as a seismic "event." For example, the seismic event may represent a recorded reflected wave.

The seismic receivers (120) are positioned at a plurality of seismic receiver locations which we may denote $(x_r, y_r)$ where x and y represent orthogonal axes on the surface (116) of the Earth above the subterranean region (102). Thus, the refracted seismic waves (110), surface waves (118), and reflected seismic waves (114) generated by a single activation of the seismic source (106) may be represented as a three-dimensional "3D" volume with axes D (t, $x_r$, $y_r$), where ($x_r$, $y_r$) represents the location of the seismic receiver (120) and t denotes the time-series at which the amplitude of ground-motion was measured. However, a seismic survey (100) may include recordings of seismic waves generated by a seismic source (106) that is positioned at a plurality of seismic source locations denoted ($x_s$, $y_s$). Thus, the seismic volume for a seismic survey (100) may be represented as a five-dimensional volume, denoted D (t, $x_r$, $y_r$, $x_s$, $y_s$), where ($x_r$, $y_r$) are vectors of seismic receiver locations along the x- and y-axes, and ($x_s$, $y_s$) are vectors of seismic source locations along the x- and y-axes.

The data collected by the seismic receivers (120) is referred to as a seismic dataset. A seismic dataset must be processed to produce valuable information, such as one or more seismic images or one or more seismic attributes. Seismic processing may be done using a seismic processing system and seismic processing typically includes subcategories such as pre-processing, noise attenuation, near-surface corrections, velocity analysis, imaging, and attribute generation. When processing a multicomponent seismic dataset, it is frequently desirable to process each component separately as each receiver component may record a cartesian component of ground motion or a different wave type. Various wavefield separation techniques exist and may include polarization analysis, frequency-wavenumber filtering, or array-forming.

Pre-processing may include sorting (e.g., "demultiplexing") and organizing the data (e.g., "sorting") including integrating the seismic data with geometry and navigation data describing the locations of seismic sources and receivers at the time the seismic data was recorded. The seismic dataset may be sorted and grouped into "gathers" such as common shot or common receiver gathers, according to the spatial coordinates of seismic sources (106) and receivers (120), respectively. In some embodiments, the seismic volume may be sorted and grouped based on a common domain, such as a common midpoint $$(x_m, y_m) = \frac{(x_s, y_s) + (x_r, y_r)}{2},$$

where ($x_s$, $y_s$) corresponds to a position of a seismic source (106) location, and ($x_r$, $y_r$) corresponds to a position of a seismic receiver (120).

A process called "stacking" typically involves summing adjacent traces within a common midpoint (CMP) gather. Stacking is commonly performed after applying moveout correction, which is a process that compensates for the delay in reflection arrival times caused by variations in offset (the distance between source (106) and receiver (120) locations). Before stacking, the dataset is referred to as a "pre-stack" seismic dataset, whereas once the CMP gathers (or any form of gathers) are stacked, the dataset is called a "post-stack" seismic dataset. Another example of a common domain is the common offset domain, where offset= $\sqrt{(x_s-x_r)^2+(y_s-y_r)^2}$.

Further, pre-processing may include removing recordings from malfunctioning receivers ("trace editing"), seismic wavelet estimation, correcting amplitudes for geometrical-spreading effects, and deconvolution (e.g., "predictive deconvolution") to remove undesirable ringing caused by the recording system or the layered structure of the earth.

Seismic noise may include both coherent source-generated and random noise. For example, coherent source-generated may include ground- and mud-roll and both short- and long-period multiple reverberation from the earth. Random noise may include wind or ocean-swell induced noise, anthropogenic noise from nearby machinery (e.g., pumps) or traffic, and may include interference from seismic surveys being conducted in adjacent areas. Noise attenuation may include high-cut filtering of high-frequency noise, removal of surface waves ("ground-roll") and other linear-propagating noise using frequency-wavenumber (e.g., "f-k" or "tau-p") filtering, and multiple attenuation.

Near-surface corrections may include correcting for "ghosts" (e.g., de-ghosting) caused by the proximity of the surface of the earth or sea surface to the seismic sources and receivers, and for near-surface seismic wave propagation velocity and attenuation effects (e.g., "statics correction"). A static correction is a time shift applied to an entire seismic trace, as opposed to a dynamic correction, where different time windows of a single seismic trace are corrected with varying time shifts (e.g., moveout correction).

In land environments, static corrections may be applied to compensate for topography, unconsolidated near-surface layers (commonly referred to as the "weathering layer"); and in marine environments, changes in tides and water velocity. In land seismic surveys, the receiver and source elevations may vary due to changes in topography but may also vary if the source is a buried source, such as dynamite. In marine seismic surveys, the source and receivers are towed below the surface of the water at different, sometimes varying depths. Statics applied to compensate for changes in elevation are referred to as "elevation static" corrections.

Static corrections applied to compensate for the near-surface weathering layer may require knowledge of near-surface velocities and near-surface layer thickness. Typically, a single-layer near-surface model is sufficient for resolving statics anomalies, although more complicated models may be used. Near-surface velocities are often computed by analyzing the velocity of refracted seismic wave (110) propagation, and the resulting static corrections may be referred to as "refraction static" corrections. The goal of refraction static corrections is to "remove" the effects of the near-surface weathering layer in the seismic data.

A "datum static" correction may be applied to adjust sources and receivers to a common surface, referred to as a datum, which is typically flat but may vary (i.e., a "floating datum"). An example of a datum for marine seismic data is mean sea level (MSL); that is, MSL (or 0 meters) will have a time of 0 milliseconds (ms) in the seismic data. In land seismic data, the datum selection may be arbitrary (e.g., above the highest elevation or below the weathering layer) and this elevation or depth will also reflect a time of 0 ms in the seismic data. Elevation statics, refraction statics and datum statics may be applied earlier on in the processing flow, leaving residual static corrections for later.

Residual or "reflection static" corrections may also be applied to fine-tune and flatten seismic reflection energy in moveout-corrected CMP gathers. Computing reliable residual statics relies heavily on developing an accurate velocity model used for moveout-correction; however, derivation of an accurate velocity model relies on properly resolved static corrections. Due to this circular relationship, residual statics and velocity analysis is typically an iterative process.

It may be desirable to compute source static and receiver static contributions independently. The sum of the source static and the receiver static is then applied to the seismic trace to create a statics-corrected trace. Applying the same source static correction for all seismic traces sharing a common source, and the same receiver static correction for all seismic traces sharing a common receiver ensure the statics are "surface consistent." Surface consistent statics increase the stability of the statics solution and take regional geological trends or variations into account.

Returning to the pre-processing flow, acquisition regularization may include compensating for irregularities in spatial sampling during seismic data acquisition. Obstacle avoidance, economics and other external factors may affect the trace spacing across a seismic survey. Acquisition regularization includes basic or advanced interpolation techniques to create uniformly sampled seismic data from irregularly-acquired seismic data.

In order to determine the correct location of reflectors within the subsurface and generate images of geological structure and seismic attributes, it is necessary to determine the seismic wave propagation velocity (a "velocity model") at points within the subsurface region of interest. A velocity model may be determined from in-situ measurements, i.e., in a wellbore and/or from the seismic data itself using a process called "velocity analysis." Various velocity analysis methods are available each with their own computational cost and accuracy characteristics. Velocity analysis may include processes such as "normal-moveout estimation," "tomography," and "full waveform inversion," or frequently, a combination of these methods all of which are familiar to a person of ordinary skill in the art.

Once a velocity model has been determined, an image of seismic wave reflection or scattering may be determined using a method termed "migration." As with velocity analysis, there are various methods of migration familiar to a person of ordinary skill in the art, each with its own computation cost and accuracy characteristics. For example, in order of increasing cost and accuracy, migration methods include Kirchhoff time migration, Kirchhoff depth migration, reverse-time migration (RTM), and least-squares revers-time migration (LSRTM). In each case a migration method aims to position a signal recorded by a seismic receiver at the location in the surface from which it was scattered or reflected.

Seismic processing may produce a number of 3D images from the seismic data representing different "attributes" of the seismic data. For example, an image of the total amplitude of scattering at each point in the subsurface may be generated. Similarly, the amplitude of scattering within a restricted range of amplitudes may be calculated. Alternatively, the mean, median or mode of the spatial- or temporal-frequency of scattered seismic waves at each point may be imaged. In still other cases, the seismic propagation velocity or seismic propagation attenuation may be used as a seismic attribute.

Although described for convenience above as a linear sequence of steps, a person of ordinary skill in the art will understand that each step of the seismic processing chain is subject to review and quality control (QC) steps of an automatic, statistical, and/or manual nature. For this reason, among others, some seismic processing steps may be repeated immediately or at a later point in the sequence, to produce an improved, refined, or updated result. For example, the seismic velocity model may be updated after an initial migration has been performed. Alternatively, additional temporal-frequency filtering may be inserted into the sequence at numerous points.

Several of these steps, such as seismic imaging and seismic attribute attenuation, require further interpretation to identify the locations within the subsurface at which hydrocarbon accumulations may be present. In some embodiments, the interpretation may occur after the generation of a post-stack seismic image or the seismic attribute. In other embodiments, the interpretation may be performed in parallel or interleaved or integrated into the process of determining the post-stack seismic image or the seismic attribute. Seismic interpretation will be discussed in more detail later.

Figure 2A:
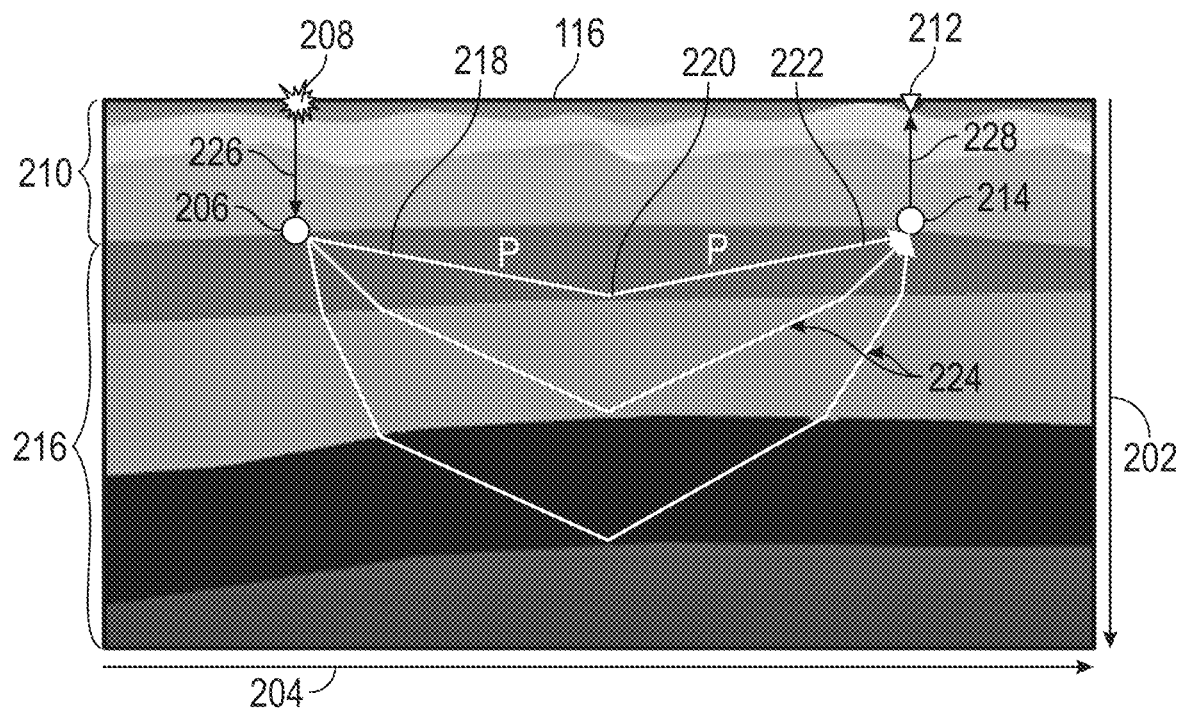
FIGS. 2A and 2B show schematic representations of statics-corrected seismic ray-paths in accordance with one or more embodiments.
Figure 2B:
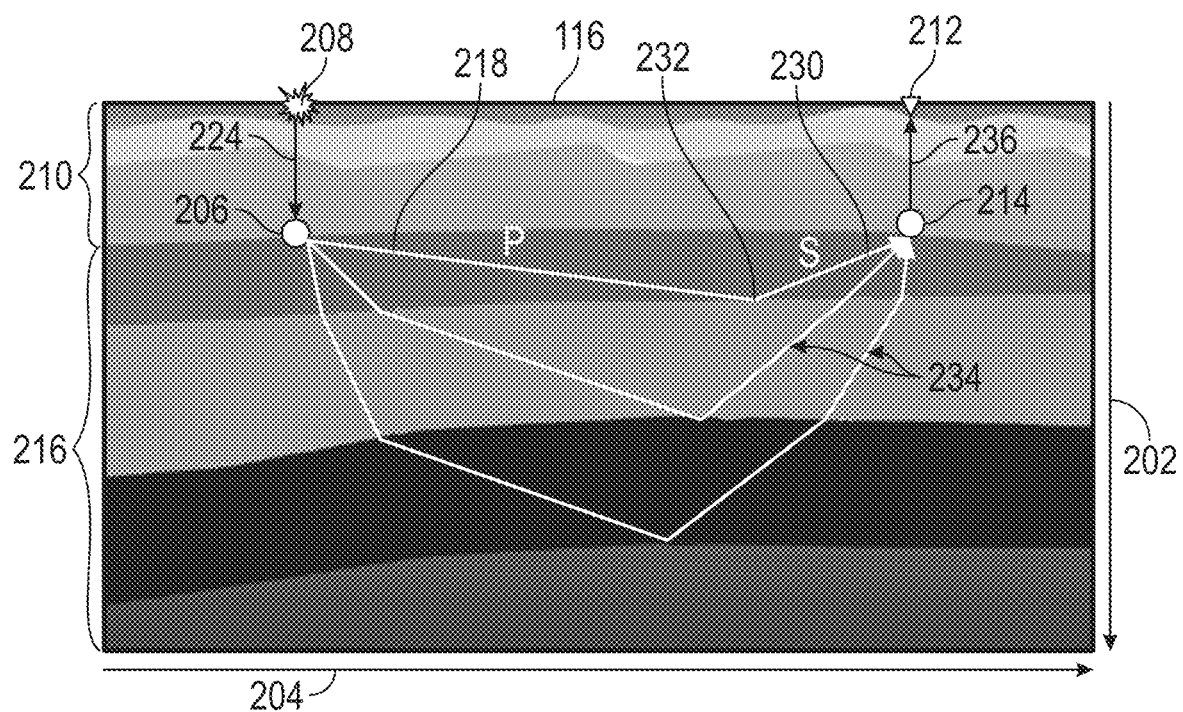

FIGS. 2A and 2B show schematic representations of statics-corrected seismic ray-paths in accordance with one or more embodiments. The vertical axes (202) represent increasing depth and horizontal axes (204) represent increasing distance from a fixed spatial location. In both FIGS. 2A and 2B, the near-surface static-corrected source location (206) sits directly below the surface source location (208), at the bottom of the near-surface weathering layer (210). Similarly, the surface receiver location (212) is situated on the surface (116) of the earth, with its near-surface static-corrected receiver location (214) below it at the base of the near-surface weathering layer (210).

In FIG. 2A, statics-corrected seismic ray-paths are shown emanating from the static-corrected source location (206), passing through deeper layers (216) in the subsurface. The ray-paths represent down-going P-waves (218) reflecting at the midpoint (220) to produce up-going P-waves (222) that are recorded at the near-surface static-corrected receiver location (214). It should be noted that the down-going P-waves (218) propagate at the same average velocity as the up-going P-waves (222), and that their angle of incidence is similar to their reflected angle as measured from the vertical. In the case where the reflecting surface is horizontal, this similarity become precise and the incident angle is equal to the reflected angle. The midpoint (220) is assumed to be at the center location between the surface source location (208) and surface receiver location (212). The near-surface statics correction for the PP-trace, as well as for the two deeper PP-traces (224), is the sum of the P-wave source-static (226) and P-wave receiver-static (228).

Similarly, FIG. 2B shows statics-corrected seismic ray-paths emanating from the static-corrected source location (206), passing through deeper layers (216) in the subsurface. In this case, the ray-paths represent down-going P-waves (218) reflecting at a conversion point (232) and converting to up-going S-waves (230) that are then recorded at the near-surface static-corrected receiver location (214). As S-wave velocity is typically lower than P-wave velocity, the up-going S-wave reflects at a higher angle than the angle of incidence (a manifestation of Snell's Law). It should be noted that the conversion point (232) is not at the center location between the surface source location (208) and surface receiver location (212) as is the case in FIG. 2A. In FIG. 2B, the near-surface statics correction for the PS-trace, as well as the two deeper PS-traces (234), is the sum of the P-wave source-static (226) and the S-wave receiver-static (236). Calculating the S-wave receiver static (236) is challenging due to difficulties of retrieving a reliable near-surface S-wave velocity model.

Conventional refraction statics methods (e.g., those used for PP-seismic data) may assume the reflection point of the seismic wave is the midpoint (220) between source and receiver locations; however, as seen in FIG. 2B this is not the case for recorded PS-seismic data. PS-seismic data reflects at the conversion point (232), which is non-trivial to determine. There exist various methods to determine common conversion points (CCPs) for PS-seismic data known to those of ordinary skill in the art. For example, for a simple one-layer model, an approximate CCP position may be calculated using source and receiver locations, as well as velocity information such as the gamma ratio (i.e., $v_p/v_s$ ratio, or simply $v_p/v_s$). For complex models, the derivation of CCPs may be iterative and may involve methods such as ray-tracing or migration.

PS-seismic data may be recorded using multicomponent seismic receivers during a seismic survey (100) as described in FIG. 1. In a conventional land seismic survey, typically one geophone, or accelerometer, is implemented per receiver location to detect ground motion in the vertical direction. In a multicomponent land seismic survey, two or three mutually orthogonal geophones or accelerometers may be implemented per receiver location to detect ground motion in two or three directions. A multicomponent seismic receiver records one trace per component. The seismic data generated from a multicomponent seismic survey may be referred to as a three-component (3C) seismic dataset. In marine or lacustrine environments, each receiver location may further include a hydrophone to measures changes in pressure. The four-component (4C) seismic receiver which will record four traces per receiver location, producing a 4C seismic dataset. Multicomponent seismic receivers allow for the determination of both the type of seismic wave and its direction of propagation.

Figure 3:
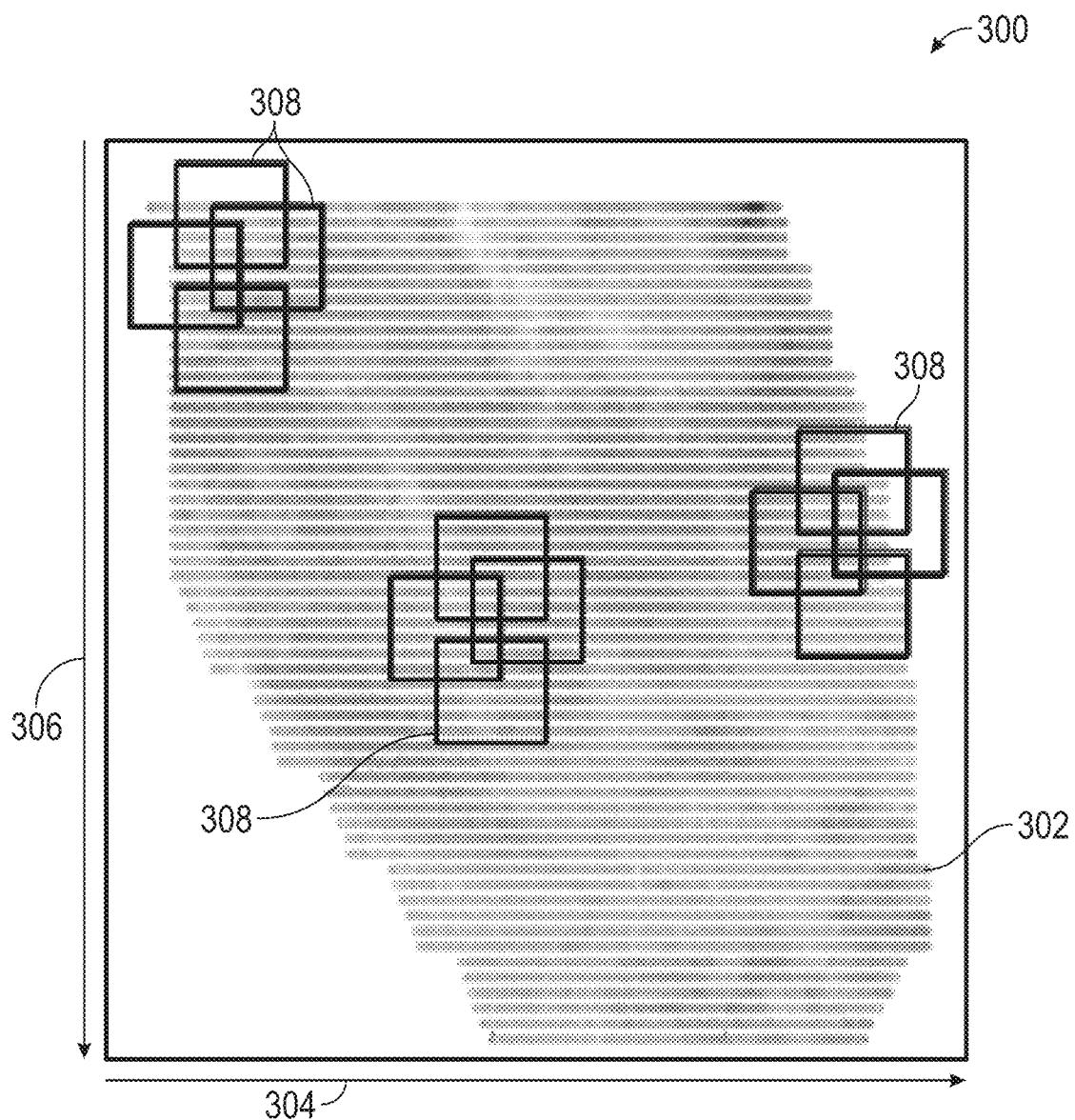
FIG. 3 shows a map view of receiver locations in accordance with one or more embodiments.

FIG. 3 shows a map view of receiver locations in accordance with one or more embodiments. Each point within the surface elevation map (300) represents a receiver location (302) having a surface elevation value, denoted by various shades of gray. The horizontal axis (304) represents receiver point number, and the vertical axis (306) represents receiver line number. Further, in FIG. 3, a number of overlapping spatial windows (308) are denoted with square boxes, covering a plurality of receiver locations and therefore containing a plurality of traces. While the overlapping spatial windows (308) shown in FIG. 3 are square, an overlapping spatial window (308) may be any shape, such as rectangular or elliptical.

The seismic data mapped in FIG. 3 may represent stacked receiver lines. For each receiver line, sorting and grouping the seismic data by common receiver location, applying moveout correction, and stacking the traces within each common receiver gather will yield a plurality of receiver line stacks. The plurality of receiver line stacks (or simply, "receiver stacks") may be divided into a plurality of overlapping spatial windows (308). Each overlapping spatial window (308) contains a plurality of traces, for which seismic attributes may be computed. The overlapping spatial windows (308) may be further constrained by a time window, creating a 3D space-time window for generating seismic attributes, such as semblance.

Semblance, also referred to as a coherence, is a quantitative measure of the similarity of waveform and energy between (typically) adjacent seismic traces. It is considered a discontinuity calculation and can also be used to highlight abrupt structural changes such as faults, or stratigraphic features such as channels. Semblance is calculated by taking the ratio of the energy of a trace to the energy of neighboring traces within the analysis window. For example, the energy of a stacked trace divided by the energy of all of the traces that make up the stack. A semblance calculation is performed for each sample, over a given analysis window to determine the similarity of an individual trace to surrounding traces.

A higher semblance value indicates a higher level of coherency within the seismic data being analyzed. For example, if the seismic data from all traces in the analysis window are perfectly coherent (e.g., show perfect continuity from trace to trace), the semblance may have a value of unity. Coherency and continuity, and therefore semblance values, are expected increase as seismic data passes through various stages of the processing flow, such as statics corrections. That is, a high semblance value computed within a space-time window may indicate the static corrections are properly resolved inside for traces inside the window.

A problem that may arise when computing semblance for seismic data is cycle-skipping. Seismic waves are made up of repeating patterns; that is, they may repeat themselves in a periodic and regular fashion over both time and space intervals. The length of one spatial repetition (known as a wave cycle) is the wavelength. The phase OM of a periodic wave, measured from 0 to 360 degrees (or from 0 to $2\pi$ radians), indicates the fraction of the cycle covered up to a specified time, t.

Cycle-skipping may occur when the phase difference between two adjacent traces is greater than half the wavelength. That is, when cycle-skipping occurs during semblance computation, the computation will not measure the intended wave cycle across all adjacent traces in the analysis window. Instead, the previous or next wave cycle may be measured in some traces. Unresolved static shifts may increase the risk of cycle-skipping when computing semblance across adjacent traces.

Figure 4:
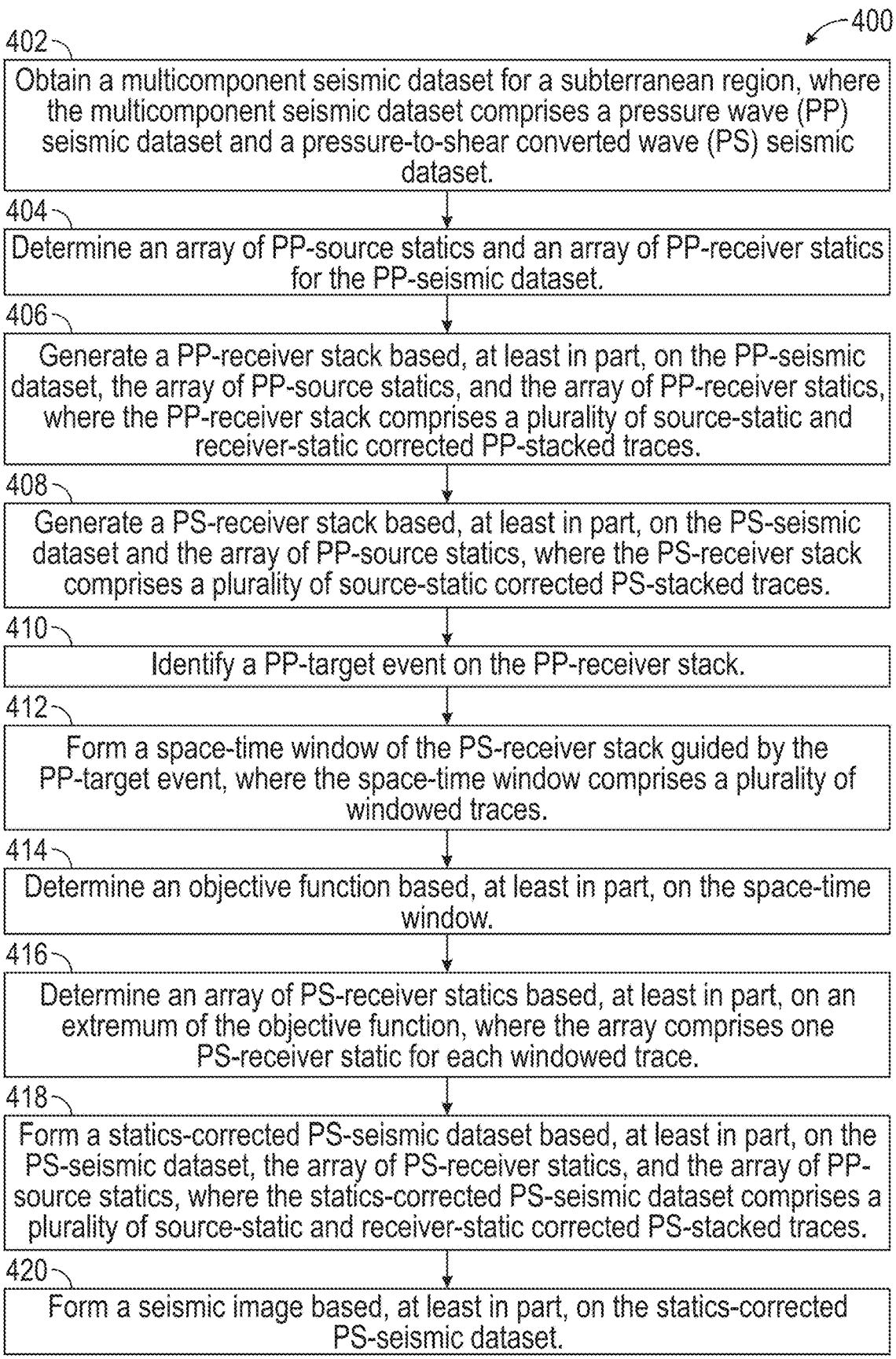
FIG. 4 shows a flowchart in accordance with one or more embodiments.
Figure 5:
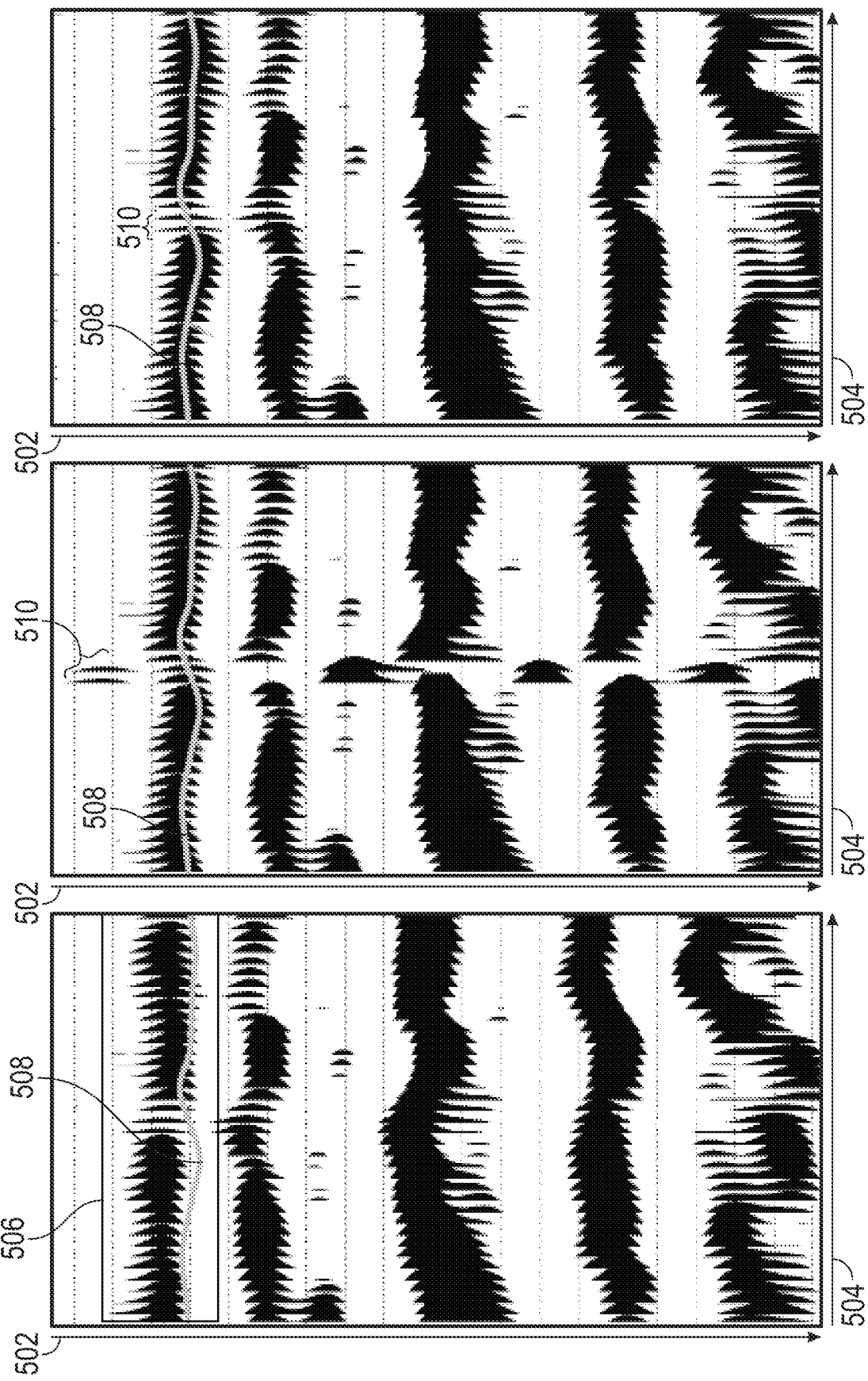
FIGS. 5A-5C show examples of PS-receiver stacks in accordance with one or more embodiments.

FIG. 4 shows a flowchart in accordance with one or more embodiments. In step 402 of flowchart (400), a multicomponent seismic dataset for a subterranean region (102) is obtained, in accordance with one or more embodiments. The multicomponent seismic dataset may include a PP-seismic dataset and a PS-seismic dataset, acquired via a seismic survey (100) using a seismic acquisition system. The seismic survey may be conducted on a terrestrial surface, i.e., the seismic survey may be a "land" seismic survey. In other embodiments, the acquired multicomponent seismic dataset may need to be separated into a PP-seismic dataset and a PS-seismic dataset using computed filters, domain transforms, or any method known to one of ordinary skill in the art.

In step 404, in accordance with one or more embodiments, an array of PP-source statics and an array of PP-receiver statics are determined for the PP-seismic dataset. The PP-source static array and PP-receiver static array may include a plurality of static values that may be refraction statics. The refraction static values may be determined by the near-surface analysis of refracted waves in the PP-seismic dataset. In some embodiments, the static values may include a datum static, or may be surface consistent.

In step 406, in accordance with one or more embodiments, a PP-receiver stack is generated based, at least in part, on the PP-seismic dataset, the array of PP-source statics, and the array of PP-receiver statics. The PP-receiver stack may include a plurality of source-static and receiver-static corrected PP-stacked traces. That is, for each seismic trace, distinct static values from the PP-source static array and the PP-receiver static array may be applied to the each of the PP-seismic traces in the PP-seismic dataset based on a source identifier and receiver identifier.

The PP-seismic dataset may be sorted and grouped into common receiver gathers. The PP-receiver stack may be formed by stacking the common receiver gathers after applying a form of moveout correction, such as normal-moveout (NMO) correction.

In step 408, in accordance with one or more embodiments, a PS-receiver stack is generated, based, at least in part, on the PS-seismic dataset and the array of PP-receiver statics. The PS-receiver stack may include a plurality of source-static corrected PS-stacked traces. That is, distinct static values from the PP-source static array may be applied to the each of the PS-seismic traces in the PS-seismic dataset based on a source identifier for each seismic trace.

Further, the PS-seismic dataset may be sorted and grouped into common receiver gathers. The PS-receiver stack may be formed by stacking the common receiver gathers after applying a form of moveout correction, such as common conversion-point normal-moveout (CCP-NMO) correction. CCP-NMO is a form of moveout correction that considers mode-conversion properties of PS-seismic data that affect reflection point calculations and non-hyperbolicity of the seismic events within a CCP gather.

In step 410, a PP-target event is identified on the PP-receiver stack, in accordance with one or more embodiments. The PP-target event may be a strong amplitude, continuous seismic event located in the shallow section of the PP-receiver stack. The PP-target event may also span a number of adjacent receiver locations. Further, the arrival time of the PP-target event may be picked for each seismic trace, either manually or using an auto-picking technique known to one of ordinary skill in the art, or by a combination of manual and auto-picking methods. The PP-target event arrival times may be passed through various QC measures to ensure accuracy.

In step 412, in accordance with one or more embodiments, a space-time window of the PS-receiver stack is formed, guided by the PP-target event, where the space-time window includes a plurality of windowed traces. In some embodiments, the PP-target event may be converted to a PS-guidance event using a conversion velocity ratio, where the PS-guidance event includes an arrival time for each source-static corrected PS-stacked trace. The conversion velocity ratio may include one or more $v_p/v_s$ ratios. The PS-guidance event corresponds to a PS-target event, the PS-target event representing the same subsurface seismic event as the PP-target event.

An intermediate PS-receiver stack may be formed by shifting each source-static corrected PS-stacked trace by a shift based, at least in part, on the arrival time of the PS-guidance event. A start time and an end time for the space-time window may be defined, based, at least in part, on the average value of the shift of each source-static corrected PS-stacked trace. The space-time window may be formed based on a portion of the intermediate PS-receiver stack, between the start time and the end time. That is, the shifted arrival time of the PS-guidance event may lie between the start time and the end time of the space-time window.

In step 414, in accordance with one or more embodiments, an objective function is determined based, at least in part, on the space-time window. In some embodiments, the objective function may include a semblance-based objective function. For example, the objective function may be a semblance (S) cost function such that:

$$S = \frac{\sum_{j=k-\left(\frac{N}{2}\right)}^{k+\left(\frac{N}{2}\right)} \left\{ \sum_{i=1}^{M} f_j[i + \delta(j) + \alpha(j)] \right\}^2}{M \sum_{j=k-\left(\frac{N}{2}\right)}^{k+\left(\frac{N}{2}\right)} \sum_{i=1}^{M} \{f_j[i + \delta(j) + \alpha(j)]\}^2} \qquad \text{Equation (1)}$$

where $f_j$ is a trace within the overlapping spatial window, M is the total number of traces in the overlapping-spatial window, N is the size of the time window (i.e., the start time subtracted from the end time), $\alpha(j)$ is the arrival time of the PS-guidance event for trace j, and $\delta(j)$ is the unknown PS-receiver static at the trace j. The overlapping spatial windows may be 3D overlapping spatial windows.

When solving Equation (1), cycle-skipping may be a challenge; therefore, the solver method should be chosen carefully. For example, the greedy back-and-forth coordinate descent method (Greedy BFCD) proposed by Villa Acuna (P. Villa Acuna "An enhanced Genetic Algorithm and its application on two non-linear geophysical problems" *Master of Science, Delft University of Technology* (2018))

allows convergence to a global extremum as opposed to a local extremum. While the Greedy BFCD method may be a suitable option to solve Equation (1), it is in no way meant to limit the scope of the invention; that is, any other suitable algorithm known to those of ordinary skill in the art may be used.

In step 416, in accordance with one or more embodiments, an array of PS-receiver statics is determined based, at least in part, on an extremum of the objective function. The extremum of the objective function may be determined by forming a plurality of arrays of time perturbations, where each array includes a distinct time perturbation for each windowed trace.

For each array of time perturbations, a perturbed space-time window may be formed by shifting the space-time window by the array of perturbations. Then, for each array of time perturbations, a value of the objective function may be determined, based on the perturbed space-time window. Next, the extremum of the objective function may be determined from the value of the objective function, for each of the plurality of arrays of time perturbations. In some embodiments, the extremum may be a maximum. Specifically, the extremum may be a maximum semblance value for the cost function in Equation (1). The array of PS-receiver statics may be determined, based on the array of time perturbations that generate the extremum, where the array of PS-receiver statics includes one PS-receiver static for each windowed trace. That is, for trace j, the time perturbation value that maximizes the semblance within the space-time window for trace j may be the PS-receiver static for trace j.

In some embodiments, an erroneous PS-receiver static (referred to hereafter as an "erroneous static") may be determined based on a statistical analysis of the array of PS-receiver statics. Specifically, the erroneous static may be determined by computing the standard deviation σ and mean μ of the PS-receiver statics $x_i$ for each trace i within a local window containing Q traces, such that:

$$\mu = \frac{1}{Q}\sum_{i=1}^{Q} x_i \qquad \text{Equation (2)}$$

$$\sigma = \sqrt{\frac{1}{Q}\sum_{i=1}^{Q}(x_i - \mu)^2}. \qquad \text{Equation (3)}$$

and $$\sigma = \sqrt{\frac{1}{Q}\sum_{i=1}^{Q}(x_i - \mu)^2}. \qquad \text{Equation (3)}$$

Static values that are outside of a statistical range may be considered erroneous. The statistical range may be [μ−wσ, μ+wσ], where w is the weight factor for the range (e.g., 0.8). A trace having an erroneous static may be flagged as a "bad trace," while a trace with a static value within the statistical range is flagged as a "good trace."

In some embodiments, bad traces may be muted, i.e., set equal to zero. In other embodiments, the erroneous static may be corrected based, at least in part, on a plurality of spatially-adjacent PS-receiver statics. That is, the erroneous static for a bad trace may be assigned a replacement static. The replacement static may be a static value from a spatially-adjacent good trace. Further, a pilot trace may be created by stacking all good traces within a local window centered on the bad trace. The bad trace may be cross-correlated with the pilot trace to determine a correction for the replacement static. The replacement static may be updated based on the correction before being assigned to the bad trace.

The array of PS-receiver statics may be updated, based on an updated extremum of the objective function. In other words, the objective function may be optimized once again using the updated replacement statics for traces flagged as bad traces. In doing so, an updated extremum of the objective function may also be determined using updated replacement statics for the bad traces. That is, for each receiver line containing bad traces, the semblance-based cost function in Equation (1) may be optimized using 2D overlapping space-time windows, where M is the number of traces within the 2D window within each receiver line.

Using the array of PS-receiver statics (which may be the updated array of PS-receiver statics) and the PS-guidance event, a bulk static (also referred to as a "bulk shift") may be determined. A bulk shift may be a constant static value applied to each trace within the receiver line. In some embodiments, the bulk static may be consistent for all receiver lines in the seismic dataset. The bulk shift is the value used to fit the statics-corrected PS-guidance event to the PS-target event. The bulk shift may be determined manually by visual QC or via cross-correlation techniques, including computing an average of cross-correlation values for a plurality of traces. The updated array of PS-receiver statics may be further updated to include a bulk shift.

In step 418, in accordance with one or more embodiments, a statics-corrected PS-seismic dataset is formed based, at least in part, on the PS-seismic dataset, the array of PS-receiver statics, and the array of PP-source statics. In some embodiments, the array of PS-receiver statics may be the updated array of PS-receiver statics including a bulk shift. Forming the statics-corrected PS-seismic dataset may include shifting each of the plurality of source-static corrected PS-stacked traces by a PS-receiver static value determined by the array of PS-receiver statics. That is, the statics-corrected PS-seismic dataset includes a plurality of source-static and receiver-static corrected PS-stacked traces.

In some embodiments, the PS-receiver stack may be divided into a plurality of overlapping spatial windows (308). A plurality of PS-partial stacks may be formed, where one PS-partial stack is formed from each of the plurality of overlapping spatial windows (308). The overlapping spatial windows (308) may be two-dimensional (2D). The space-time window may be a three-dimensional (3D) overlapping spatial window (308) constrained by a start time and an end time. In some embodiments, the statics-corrected PS-seismic dataset may be formed based, at least in part, on merging the plurality of overlapping spatial windows.

In other embodiments, each of the plurality of traces within an overlapping spatial window (308) may be used to determine statics for each trace; however, only the static value(s) of the centermost trace(s) may be considered. The number of centermost traces may be a function of the overlap value and the size of the overlapping spatial window (308). That is, when merging the plurality of overlapping spatial windows, the static values in the overlap zones may not be used to form the array of PS-receiver statics. An example of forming a statics-corrected PS-seismic dataset is described in FIGS. 5A-5C.

FIGS. 5A-5C show examples of PS-receiver stacks in accordance with one or more embodiments. Specifically, FIGS. 5A-5C show the effect of the application of PS-receiver statics for an example PS-receiver stack, where the vertical axis (502) represents increasing time and the horizontal axis (504) represents receiver point number within the receiver line. Waveforms representing seismic events are shown in FIGS. 5A-5C, where only the positive amplitudes of each waveform are drawn.

In FIG. 5A, the PS-receiver stack has only PP-source statics applied. A box is drawn around the PS-target event (506), which corresponds to the PS-guidance event arrival times (508). The PS-guidance event arrival times (508) may be converted from manually picked PP-target event arrival times using velocity conversion information, such as a $v_p/v_s$ ratio. For each trace, the PP-target event arrival time may be picked on the peak (the largest positive amplitude), or the first break (i.e., the onset of energy) associated with the targeted seismic event.

FIG. 5B shows the PS-receiver stack with PP-source statics and PS-receiver statics applied. In other words, FIG. 5B is a statics-corrected PS-receiver stack. The array of PS-receiver statics was computed using the method described in flowchart (400) of FIG. 4. It should be noted that after the application of PS-receiver statics, the same PS-target event (506) indicated in FIG. 5A has now been shifted closer to the PS-guidance event arrival times (508), excluding two bad traces (510) with erroneous statics.

Erroneous statics may be caused by low signal-to-noise ratio seismic data. The two bad traces (510) have weaker positive amplitudes in the portion of the waveform representing the PS-target event (506) than the surrounding traces, i.e., the two bad traces have a lower signal to noise ratio than surrounding traces. As discussed in step 416, the bad traces (510) with erroneous statics may be flagged using statistical analysis computations, such as in Equations (2) and (3). In this example, the erroneous statics are replaced with statics from neighboring traces, then are fine-tuned using cross-correlation with a pilot trace generated from spatially-adjacent good traces. The PS-receiver statics are then updated once again by optimizing Equation (1), this time using the fine-tuned replacement statics for the two bad traces (510).

FIG. 5C shows the PS-receiver stack with PP-source statics and updated PS-receiver statics applied. The updated PS-receiver statics include a bulk shift static. One of ordinary skill in the art would appreciate that the two bad traces (510) with updated statics have been corrected in FIG. 5C. Further, the PS-target event follows the PS-guidance event arrival times (508) after applying the updated PS-receiver statics, indicating the static corrections are resolved.

Returning to flowchart (400) in FIG. 4, in step 420, a seismic image is formed, in accordance with one or more embodiments. The seismic image is formed based, at least in part, on the statics-corrected PS-seismic dataset. The statics-corrected PS-seismic dataset may undergo further pre-processing or may be used to generate a PS-seismic velocity model. A corresponding PP-seismic dataset may be used to generate a PP-seismic velocity model, used in conjunction with the PS-seismic velocity model to extract a $v_p/v_s$ ratio. Velocity information derived from the PP-seismic dataset or the PS-seismic dataset may be used for migration. In some embodiments, the seismic image may be a migrated seismic image. The migrated seismic image may be further processed, the processing steps typically referred to as "post-processing." Post-processing may include frequency filtering, amplitude balancing, noise attenuation, or dip filtering.

In accordance with one or more embodiments, a location of a hydrocarbon reservoir (104) may be determined, based on the seismic image. The seismic image or its attributes (e.g., a $v_p/v_s$ ratio) may be used to determine geological properties in order to locate a hydrocarbon reservoir (104). The process of determining geological properties from a seismic image or seismic attribute image is called seismic interpretation. For example, identifying a discontinuity in an otherwise continuous surface of high amplitude seismic reflections as a geological fault, or identifying a region with anomalously high seismic wave attenuation as indicative of a hydrocarbon gas deposit, are examples of seismic interpretations.

Seismic interpretation may include manual steps, such as "picking" a sparse set of points on a single interpreted undulating geological boundary, and automatic or algorithmic steps, such as picking all the remaining grid points, intervening between the manually picked points, lying on the boundary using the manually picked points as a guide or "seeds".

Often the output of seismic interpretation includes the seismic image, or attribute image, with the interpretation of labelled geological boundaries, faults, well markers, pore fluid contact levels, gas deposits etc., drawn and annotated on the image. In the past, such interpretation was performed using displays of portions of the seismic image printed on paper with the interpretation drawn, originally hand-drawn, on the paper using colored pen or pencils. Now, a seismic interpreter of ordinary skill in the art will, almost without exception, use a seismic interpretation workstation to perform seismic interpretation.

A seismic interpretation workstation may include one or more computer processors and a computer-readable medium (memory) containing instructions executable by the processor. The computer memory may further contain seismic images and/or seismic attributes. The seismic interpretation workstation may also include a display mechanism, usually one or more monitor screens, but sometimes one or more projector, user-wearable goggles or other virtual reality display equipment and a means of interacting with the display, such as a computer mouse or wand. Further, the seismic interpretation workstation may include dedicated hardware designed to expedite the rendering and display of the seismic image, images, or attributes in a manner and at a speed to facilitate real-time interaction between the user and the data. For example, the seismic interpretation workstation may allow the seismic interpreter to scroll through adjacent slices through a 3D seismic image to visually track the continuity of a candidate geological boundary throughout the 3D image. Alternatively, the seismic interpretation workstation may allow the seismic interpreter to manually control the rotation of the view angle of the seismic image so it may be viewed from above, or from the East or from the West, or from intermediate directions.

As for the seismic interpretation system, the computer processor or processors and computer memory of the seismic interpretation workstation may be co-located with the seismic interpreter, while in other cases the computer processor and memory may be remotely located from the seismic interpreter, such as on "the cloud." In the latter case, the seismic or attribute images may only be displayed on a screen, including a laptop or tablet local to the seismic interpreter, who may interact with the computer processor via instructions sent over a network, including a secure network such as a virtual private network (VPN).

The interpreted seismic image may be used, together with other available information, to determine the location of the hydrocarbon reservoir (104) with a high degree of certainty. Further, the interpreted seismic image may be used to determine locations within a hydrocarbon reservoir (104) for which wellbores may be drilled, safely and economically, to produce the hydrocarbons.

Figure 6:
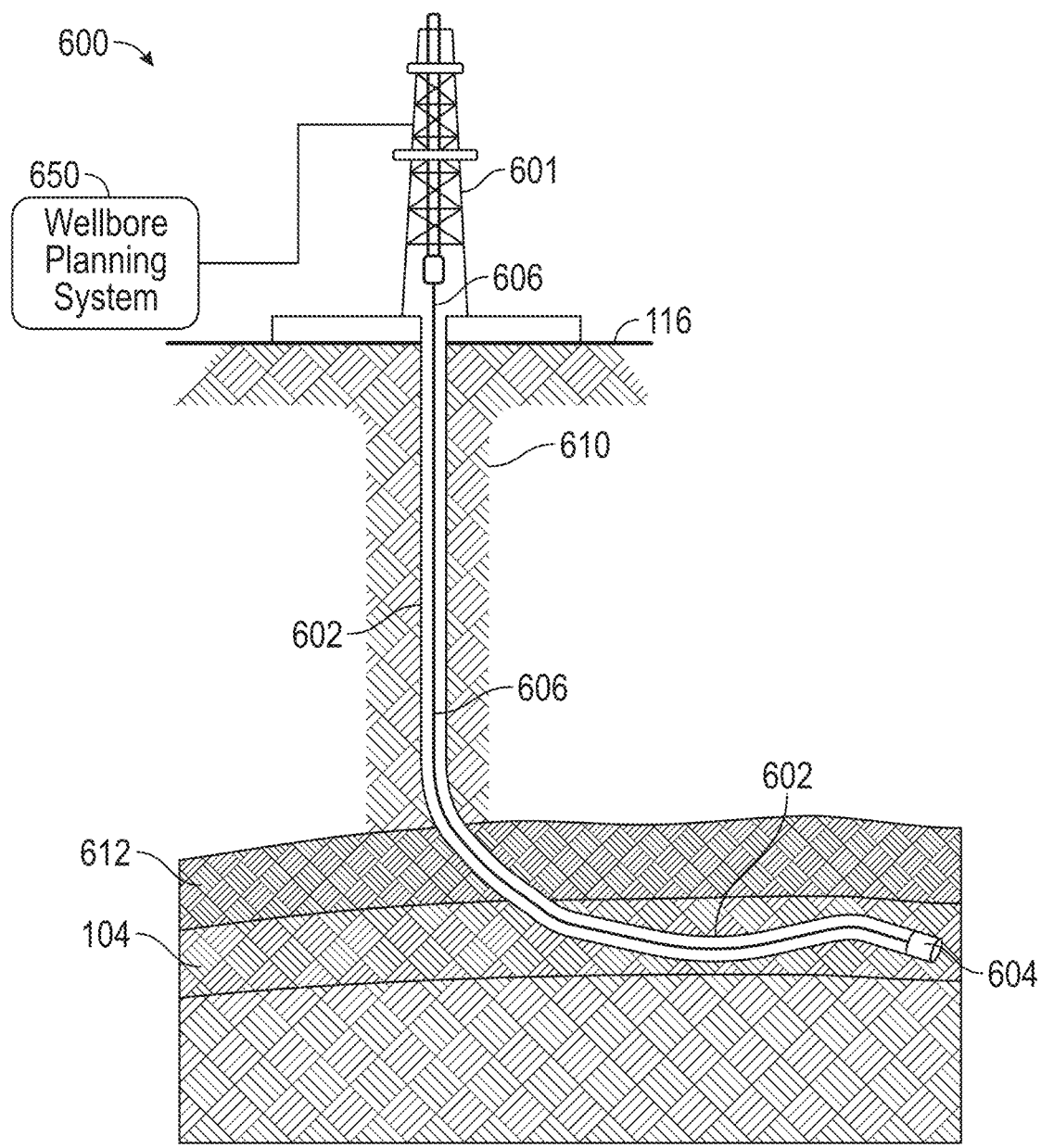
FIG. 6 shows a wellbore drilling system in accordance with one or more embodiments.

FIG. 6 shows a wellbore drilling system (600) in accordance with one or more embodiments. As shown in FIG. 6, a wellbore path (602) may be drilled by a drill bit (604) attached by a drillstring (606) to a drill rig (601) located on the surface (116) of the earth. The wellbore may traverse a plurality of overburden layers (610) and one or more caprock layers (612) to a hydrocarbon reservoir (104). In accordance with one or more embodiments, the seismic image may be used to plan a wellbore path (602) and drill a wellbore guided by the wellbore path (602). The wellbore path (602) may be a curved wellbore path, or a straight wellbore path. All or part of the wellbore path (602) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the targeted hydrocarbon bearing formation and a planned wellbore path (602) from the starting location to the terminal location. In other words, the wellbore path (602) may intersect a previously located hydrocarbon reservoir (104).

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Furthermore, the wellbore plan may consider other engineering constraints such as the maximum wellbore curvature ("doglog") that the drillstring (606) may tolerate and the maximum torque and drag values that the wellbore drilling system (600) may tolerate.

A wellbore planning system (650) may be used to generate the wellbore plan. The wellbore planning system (650) may comprise one or more computer processors in communication with computer memory containing the geophysical and geomechanical models, information relating to drilling hazards, and the constraints imposed by the limitations of the drillstring (606) and the wellbore drilling system (600). The wellbore planning system (650) may further include dedicated software to determine the planned wellbore path (602) and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore.

A wellbore may be drilled using a drill rig (601) that may be situated on a land drill site, an offshore platform, such as a jack-up rig, a semi-submersible, or a drill ship. The drill rig (601) may be equipped with a hoisting system, which can raise or lower the drillstring (606) and other tools required to drill the well. The drillstring (606) may include one or more drill pipes connected to form conduit and a bottom hole assembly (BHA) disposed at the distal end of the drillstring (606). The BHA may include a drill bit (604) to cut into subsurface rock. The BHA may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore. Both MWD and LWD measurements may be transmitted to the surface (116) using any suitable telemetry system, such as mud-pulse or wired-drill pipe, known in the art.

To start drilling, or "spudding in" the well, the hoisting system lowers the drillstring (606) suspended from the drill rig (601) towards the planned surface location of the wellbore. An engine, such as a diesel engine, may be used to rotate the drillstring (606). The weight of the drillstring (606) combined with the rotational motion enables the drill bit to bore the wellbore.

The near-surface is typically made up of loose or soft sediment or rock, so large diameter casing, e.g. "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (116) of the earth.

Drilling may continue without any casing once deeper more compact rock is reached. While drilling, drilling mud may be injected from the surface (116) through the drill pipe. Drilling mud serves various purposes, including pressure equalization, removal of rock cuttings, or drill bit cooling and lubrication. At planned depth intervals, drilling may be paused and the drillstring (606) withdrawn from the wellbore. Sections of casing may be connected and inserted and cemented into the wellbore. Casing string may be cemented in place by pumping cement and mud, separated by a "cementing plug," from the surface (116) through the drill pipe. The cementing plug and drilling mud force the cement through the drill pipe and into the annular space between the casing and the wellbore wall. Once the cement cures drilling may recommence. The drilling process is often performed in several stages. Therefore, the drilling and casing cycle may be repeated more than once, depending on the depth of the wellbore and the pressure on the wellbore walls from surrounding rock. Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A wellbore drilling system (600) may be disposed at and communicate with other systems in the well environment. The wellbore drilling system (600) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure WOB (weight on bit), RPM (drill rotational speed), GPM (flow rate of the mud pumps), and ROP (rate of penetration of the drilling operation). Each sensor may be positioned or configured to measure a desired physical stimulus. Drilling may be considered complete when a target zone is reached, or the presence of hydrocarbons is established.

Figure 7:
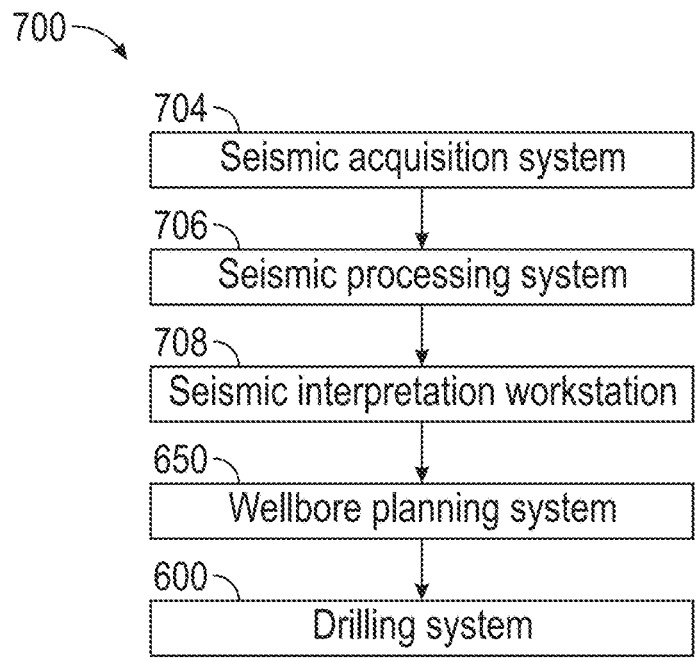
FIG. 7 shows a block diagram of systems in accordance with one or more embodiments.

FIG. 7 shows a block diagram of systems (700) in accordance with one or more embodiments. Each system may be coupled to one or more other systems within the series of systems (700). The seismic acquisition system (704) may be configured to record a multicomponent seismic dataset generated during a seismic survey (100) of a subterranean region (102), as previously described in FIG. 1. The multicomponent seismic dataset may be physically transferred to the seismic processing system (706) in the form of tape readers or high-capacity hard drives.

The seismic processing system (706) may receive the multicomponent seismic dataset and may be used to process the multicomponent seismic dataset. This may include processing steps such as pre-processing, noise attenuation, near-surface corrections (e.g., statics corrections), velocity analysis, migration (i.e., imaging), or attribute generation. In some embodiments, the seismic processing system (706) may be used to determine an array of PS-receiver statics, which may be used to form a statics-corrected PS-seismic dataset. Further, the seismic processing system (706) may be used to form a seismic image based on the statics-corrected PS-seismic dataset. The seismic image may be transferred to a seismic interpretation workstation (708).

The seismic interpretation workstation (708) may be used to determine a location of a hydrocarbon reservoir (104) (or other subterranean features), based on the seismic image.

Knowledge of the location of the hydrocarbon reservoir (104) and other subterranean features may be transferred to a wellbore planning system (650). The wellbore planning system (650) may use information regarding the hydrocarbon reservoir (104) location to plan a wellbore path from the surface (116) of the earth to penetrate the hydrocarbon reservoir (104).

Information regarding the planned wellbore path may be transferred to the wellbore drilling system (600) described in FIG. 6. The wellbore drilling system (600) may drill the wellbore along the planned wellbore path to access and produce the hydrocarbon reservoir (104).

Figure 8:
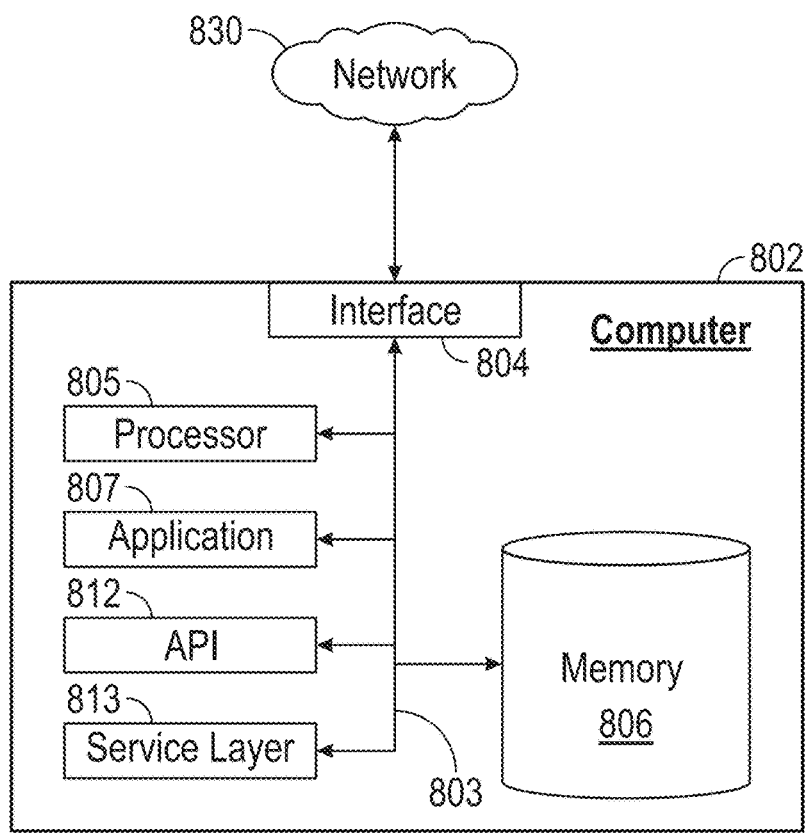
FIG. 8 shows a computer system in accordance with one or more embodiments.

Systems such as the seismic acquisition system (704), the seismic processing system (706), the seismic interpretation workstation (708), and the wellbore planning system (650), may all include or be implemented on one or more computer systems such as the one shown in FIG. 8.

FIG. 8 shows a system in accordance with one or more embodiments. The computer system is used to provide computational functionalities associated with described algorithms, methods, functions, processes, flows, and procedures as described in the present disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a graphical user interface (GUI).

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). For example, a generic computer (802), seismic processing system (706), and seismic interpretation workstation (708) may be communicably coupled using a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application, for example, executing on another computer (802) and responding to the received requests by processing the said requests in an appropriate software application. For example, since seismic processing and seismic interpretation may be not be sequential, each computer (802) system may receive requests over a network (830) from any other computer (802) and respond to the received requests appropriately. In addition, requests may also be sent to the computer (802) from internal users (for example, from a command console or by other appropriate access method), external or third-parties, other automated applications, as well as any other appropriate entities, individuals, systems, or computers.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) also includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) further includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) or a combination of the API (812) and service layer (813). The API (812) may include specifications for routines, data structures, and object classes. The API (812) may be either computer-language independent or dependent and refer to a complete interface, a single function, or even a set of APIs.

The service layer (813) provides software services to the computer (802) or other components (whether illustrated or not) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

There may be any number of computers (802) associated with, or external to, a computer system containing computer (802), wherein each computer (802) communicates over network (830). For example, one computer system may be specifically configured for seismic processing and denoted the seismic processing system (706). Another computer system may be specifically configured for seismic interpretation and denoted the seismic interpretation workstation (708). In some embodiments, seismic processing such as steps 404-420 of FIG. 4 may be conducted using a first computer (802) and one or more first applications (807) while seismic interpretation may be conducted on a second computer (802) using one or more second applications (807).

Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as limited only by the scope of the following claims.

What is claimed is:

1. A method, comprising:
obtaining a multicomponent seismic dataset for a subterranean region, wherein the multicomponent seismic dataset comprises a pressure wave (PP) seismic dataset and a pressure-to-shear converted wave (PS) seismic dataset;
determining an array of PP-source statics and an array of PP-receiver statics for the PP-seismic dataset;
generating a PP-receiver stack based, at least in part, on the PP-seismic dataset, the array of PP-source statics, and the array of PP-receiver statics, wherein the PP-receiver stack comprises a plurality of source-static and receiver-static corrected PP-stacked traces;
generating a PS-receiver stack based, at least in part, on the PS-seismic dataset and the array of PP-source statics, wherein the PS-receiver stack comprises a plurality of source-static corrected PS-stacked traces;
identifying a PP-target event on the PP-receiver stack;
forming a space-time window of the PS-receiver stack guided by the PP-target event, wherein the space-time window comprises a plurality of windowed traces;
determining an objective function based, at least in part, on the space-time window;
determining an array of PS-receiver statics based, at least in part, on an extremum of the objective function, wherein the array comprises one PS-receiver static for each windowed trace;
forming a statics-corrected PS-seismic dataset based, at least in part, on the PS-seismic dataset, the array of PS-receiver statics, and the array of PP-source statics, wherein the statics-corrected PS-seismic dataset comprises a plurality of source-static and receiver-static corrected PS-stacked traces; and
forming a seismic image based, at least in part, on the statics-corrected PS-seismic dataset.

2. The method of claim 1, wherein forming the space-time window comprises:
converting the PP-target event to a PS-guidance event using a conversion velocity ratio, wherein the PS-guidance event comprises an arrival time for each source-static corrected PS-stacked trace;
forming an intermediate PS-receiver stack by shifting each source-static corrected PS-stacked trace by a shift based, at least in part, on the arrival time of the PS-guidance event;
defining a start time and an end time for the space-time window based, at least in part, on an average value of the shift of each source-static corrected PS-stacked trace; and
forming the space-time window, based on a portion of the intermediate PS-receiver stack between the start time and the end time.

3. The method of claim 1, wherein determining the extremum of the objective function comprises:
forming a plurality of arrays of time perturbations, wherein each array comprises a distinct time perturbation for each windowed trace;
for each array of time perturbations:
forming a perturbed space-time window by shifting the space-time window by the array of time perturbations; and
determining a value of the objective function based on the perturbed space-time window;

determining the extremum of the objective function from the value of the objective function for each of the plurality of arrays of time perturbations; and determining the array of PS-receiver statics based on the array of time perturbations that generate the extremum.

4. The method of claim 1, wherein forming the statics-corrected PS-seismic dataset comprises shifting each of the plurality of source-static corrected PS-stacked traces by a PS-receiver static value determined by the array of PS-receiver statics.

5. The method of claim 1, further comprising:
determining an erroneous PS-receiver static based on a statistical analysis of the array of PS-receiver statics;
correcting the erroneous PS-receiver static based, at least in part, on a plurality of spatially-adjacent PS-receiver statics; and
updating the array of PS-receiver statics based on an updated extremum of the objective function.

6. The method of claim 1, further comprising:
dividing the PS-receiver stack into a plurality of overlapping spatial windows;
forming a plurality of PS-partial stacks, wherein one PS-partial stack is formed from each of the plurality of overlapping spatial windows; and
forming the statics-corrected PS-seismic dataset based, at least in part, on merging the plurality of overlapping spatial windows.

7. The method of claim 1, wherein the objective function comprises a semblance-based objective function.

8. The method of claim 1, further comprising:
determining, using a seismic interpretation workstation, a location of a hydrocarbon reservoir based, at least in part, on the seismic image; and
planning, using a wellbore planning system, a wellbore path to penetrate the hydrocarbon reservoir based on the location.

9. The method of claim 8, further comprising drilling, using a drilling system, a wellbore guided by the planned wellbore path.

10. A non-transitory computer readable memory, having computer-executable instructions stored thereon that, when executed by a processor, perform steps comprising:
receiving a multicomponent seismic dataset for a subterranean region, wherein the multicomponent seismic dataset comprises a pressure wave (PP) seismic dataset and a pressure-to-shear converted wave (PS) seismic dataset;
determining an array of PP-source statics and an array of PP-receiver statics for the PP-seismic dataset;
generating a PP-receiver stack based, at least in part, on the PP-seismic dataset, the array of PP-source statics, and the array of PP-receiver statics, wherein the PP-receiver stack comprises a plurality of source-static and receiver-static corrected PP-stacked traces;
generating a PS-receiver stack based, at least in part, on the PS-seismic dataset and the array of PP-source statics, wherein the PS-receiver stack comprises a plurality of source-static corrected PS-stacked traces;
identifying a PP-target event on the PP-receiver stack;
forming a space-time window of the PS-receiver stack guided by the PP-target event, wherein the space-time window comprises a plurality of windowed traces;
determining an objective function based, at least in part, on the space-time window;

determining an array of PS-receiver statics based, at least in part, on an extremum of the objective function, wherein the array comprises one PS-receiver static for each windowed trace;
forming a statics-corrected PS-seismic dataset based, at least in part, on the PS-seismic dataset, the array of PS-receiver statics, and the array of PP-source statics, wherein the statics-corrected PS-seismic dataset comprises a plurality of source-static and receiver-static corrected PS-stacked traces; and
forming a seismic image based, at least in part, on the statics-corrected PS-seismic dataset.

11. The non-transitory computer readable memory of claim 10, wherein forming the space-time window comprises:
converting the PP-target event to a PS-guidance event using a conversion velocity ratio, wherein the PS-guidance event comprises an arrival time for each source-static corrected PS-stacked trace;
forming an intermediate PS-receiver stack by shifting each source-static corrected PS-stacked trace by a shift based, at least in part, on the arrival time of the PS-guidance event;
defining a start time and an end time for the space-time window based, at least in part, on an average value of the shift of each source-static corrected PS-stacked trace; and
forming the space-time window, based on a portion of the intermediate PS-receiver stack between the start time and the end time.

12. The non-transitory computer readable memory of claim 10, wherein determining the extremum of the objective function comprises:
forming a plurality of arrays of time perturbations, wherein each array comprises a distinct time perturbation for each windowed trace;
for each array of time perturbations:
forming a perturbed space-time window by shifting the space-time window by the array of time perturbations; and
determining a value of the objective function based on the perturbed space-time window;
determining the extremum of the objective function from the value of the objective function for each of the plurality of arrays of time perturbations; and
determining the array of PS-receiver statics based on the array of time perturbations that generate the extremum.

13. The non-transitory computer readable memory of claim 10, wherein the steps further comprise:
determining an erroneous PS-receiver static based on a statistical analysis of the array of PS-receiver statics;
correcting the erroneous PS-receiver static based, at least in part, on a plurality of spatially-adjacent PS-receiver statics; and
updating the array of PS-receiver statics based on an updated extremum of the objective function.

14. The non-transitory computer readable memory of claim 10, wherein the steps further comprise:
dividing the PS-receiver stack into a plurality of overlapping spatial windows;
forming a plurality of PS-partial stacks, wherein one PS-partial stack is formed from each of the plurality of overlapping spatial windows; and
forming the statics-corrected PS-seismic dataset based, at least in part, on merging the plurality of overlapping spatial windows.

15. The non-transitory computer readable memory of claim 10, wherein the steps further comprise determining a location of a hydrocarbon reservoir based, at least in part, on the seismic image.

16. The non-transitory computer readable memory of claim 15, wherein the steps further comprise planning a wellbore path to penetrate the hydrocarbon reservoir based on the location.

17. A system, comprising:
a seismic acquisition system configured to record a multicomponent seismic dataset for a subterranean region, wherein the multicomponent seismic dataset comprises a pressure wave (PP) seismic dataset and a pressure-to-shear converted wave (PS) seismic dataset; and
a seismic processing system configured to:
receive the multicomponent seismic dataset,
determine an array of PP-source statics and an array of PP-receiver statics for the PP-seismic dataset,
generate a PP-receiver stack based, at least in part, on the PP-seismic dataset, the array of PP-source statics, and the array of PP-receiver statics, wherein the PP-receiver stack comprises a plurality of source-static and receiver-static corrected PP-stacked traces,
generate a PS-receiver stack based, at least in part, on the PS-seismic dataset and the array of PP-source statics, wherein the PS-receiver stack comprises a plurality of source-static corrected PS-stacked traces,
identify a PP-target event on the PP-receiver stack,
form a space-time window of the PS-receiver stack guided by the PP-target event, wherein the space-time window comprises a plurality of windowed traces,
determine an objective function based, at least in part, on the space-time window,
determine an array of PS-receiver statics based, at least in part, on an extremum of the objective function, wherein the array comprises one PS-receiver static for each windowed trace,
form a statics-corrected PS-seismic dataset based, at least in part, on the PS-seismic dataset, the array of PS-receiver statics, and the array of PP-source statics, wherein the statics-corrected PS-seismic dataset comprises a plurality of source-static and receiver-static corrected PS-stacked traces, and
form a seismic image based, at least in part, on the statics-corrected PS-seismic dataset.

18. The system of claim 17, wherein determining the extremum of the objective function comprises:
forming a plurality of arrays of time perturbations, wherein each array comprises a distinct time perturbation for each windowed trace;
for each array of time perturbations:
forming a perturbed space-time window by shifting the space-time window by the array of time perturbations; and
determining a value of the objective function based on the perturbed space-time window;
determining the extremum of the objective function from the value of the objective function for each of the plurality of arrays of time perturbations; and
determining the array of PS-receiver statics based on the array of time perturbations that generate the extremum.

19. The system of claim 17, the seismic processing system further configured to:
determine an erroneous PS-receiver static based on a statistical analysis of the array of PS-receiver statics;
correct the erroneous PS-receiver static based, at least in part, on a plurality of spatially-adjacent PS-receiver statics; and
update the array of PS-receiver statics based on an updated extremum of the objective function.

20. The system of claim 17, further comprising:
a seismic interpretation workstation configured to determine a location of a hydrocarbon reservoir based, at least in part, on the seismic image;
a wellbore planning system configured to plan a wellbore path to penetrate the hydrocarbon reservoir based on the location; and
a drilling system configured to drill a wellbore guided by the planned wellbore path.

* * * * *